(12) United States Patent
Kunugi

(10) Patent No.: US 10,268,462 B2
(45) Date of Patent: Apr. 23, 2019

(54) EMULATION DEVICE, EMULATION METHOD, AND RECORDING MEDIUM STORING EMULATION PROGRAM

(71) Applicant: NEC Platforms, Ltd., Kawasaki-shi, Kanagawa (JP)

(72) Inventor: Dai Kunugi, Kanagawa (JP)

(73) Assignee: NEC PLATFORMS, LTD., Kanagawa (JP)

( * ) Notice: Subject to any disclaimer, the term of this patent is extended or adjusted under 35 U.S.C. 154(b) by 0 days.

(21) Appl. No.: 15/656,108

(22) Filed: Jul. 21, 2017

(65) Prior Publication Data
US 2018/0052667 A1  Feb. 22, 2018

(30) Foreign Application Priority Data
Aug. 17, 2016 (JP) ................................. 2016-160017

(51) Int. Cl.
 *G06F 8/41* (2018.01)
 *G06F 9/30* (2018.01)
 *G06F 9/455* (2018.01)

(52) U.S. Cl.
CPC .............. *G06F 8/434* (2013.01); *G06F 8/443* (2013.01); *G06F 9/3017* (2013.01);
(Continued)

(58) Field of Classification Search
None
See application file for complete search history.

(56) References Cited

U.S. PATENT DOCUMENTS 5,751,982 A * 5/1998 Morley ............... G06F 9/45504
   703/26
5,768,593 A * 6/1998 Walters ............... G06F 9/45516
   703/26

(Continued)

FOREIGN PATENT DOCUMENTS

JP   H06-202877 A   7/1994
JP   H07-210397 A   8/1995

(Continued)

OTHER PUBLICATIONS

Code Project—Inline assembly, Using Inline Assembly in C/C++, Oct. 14, 2006, located at https://www.codeproject.com/Articles/15971/Using-Inline-Assembly-in-C-C.*

(Continued)

*Primary Examiner* — Hossain M Morshed

(57) ABSTRACT

An emulation device 3 includes a storage unit 70 which stores information in which instruction information 710 including a type of an instruction 711 and an operand 712 included in emulation-execution-target-software 71, compiled instruction information 72 obtained by compiling the instruction information 710 capable of being emulated, and information 73 indicating a storage address of the compiled instruction information 72 are associated with, and a generation unit 80 which generates compiled software 81 that is compiled for the emulation-execution-target-software 71 capable of being emulated by converting the instruction information 710 into the subroutine-read-instruction-information which calls the compiled instruction information 72 associated with the instruction information 710 from the storage address.

9 Claims, 16 Drawing Sheets

(52) U.S. Cl.
CPC ...... *G06F 9/30058* (2013.01); *G06F 9/30181* (2013.01); *G06F 9/455* (2013.01); *G06F 9/4552* (2013.01)

(56) References Cited

U.S. PATENT DOCUMENTS

| | | | |
|---|---|---|---|
| 6,848,098 B1 | 1/2005 | Tsuboi | |
| 7,389,500 B2* | 6/2008 | Tan | G06F 9/45516 717/137 |
| 10,133,655 B1* | 11/2018 | Norton | G06F 11/3652 |
| 2004/0003375 A1 | 1/2004 | George et al. | |
| 2005/0160407 A1 | 7/2005 | Takamura et al. | |
| 2007/0226683 A1 | 9/2007 | Stoodley et al. | |
| 2007/0226714 A1* | 9/2007 | Doi | G06F 9/45504 717/148 |
| 2010/0169072 A1* | 7/2010 | Zaki | G06F 8/30 703/28 |

FOREIGN PATENT DOCUMENTS

| | | |
|---|---|---|
| JP | H08-123697 A | 5/1996 |
| JP | H10-40112 A | 2/1998 |
| JP | H11-24940 A | 1/1999 |
| JP | 2000-231494 A | 8/2000 |
| JP | 2001-142718 A | 5/2001 |
| JP | 2005-202614 A | 7/2005 |
| JP | 2005-346407 A | 12/2005 |
| JP | 2007-018254 A | 1/2007 |
| JP | 2010-140233 A | 6/2010 |
| JP | 4713820 B2 | 6/2011 |

OTHER PUBLICATIONS

Search Results—Call Overhead, Inline Assembly Reduce Overhead, 2018, Google.Com.*
Search Reasults—emulation device, Emulation Device, 2018, Google.Com.*
Search Reasults—Hot code Inlineing, Inline Assembly hotcode, 2018, Google.com.*
Search Results—Inline assembly, Inline Assembly, 2018, Google.com.*
Fabrice Bellard, "QEMU, a Fast and Portable Dynamic Translator", 2005, Freenix Track: 2005 USENIX Annual Technical Conference (Year: 2005).*
Japanese Office Action for JP Application No. 2016-160017 dated Nov. 27, 2018 with English Translation.

* cited by examiner

Fig. 4

DATA FOR I/F BETWEEN PROCESSORS

~342

3420 REQUEST BUFFER

| ENTRY | COMPILATION START ADDRESS IN EMULATION-EXECUTION-TARGET-SOFTWARE | VALIDITY FLAG |
|---|---|---|
| ENTRY 0 | COMPILATION START ADDRESS 0 | 0xFF |
| ENTRY 1 | COMPILATION START ADDRESS 1 | 0xFF |
| ENTRY 2 | COMPILATION START ADDRESS 2 | 0x00 |
| ENTRY 3 | COMPILATION START ADDRESS 3 | 0x00 |
| ENTRY 4 | COMPILATION START ADDRESS 4 | 0xFF |
| ENTRY 5 | COMPILATION START ADDRESS 5 | 0xFF |
| ENTRY 6 | COMPILATION START ADDRESS 6 | 0x00 |
| ENTRY 7 | COMPILATION START ADDRESS 7 | 0xFF |

DATA FOR I/F BETWEEN PROCESSORS

3421 INSTRUCTION INFORMATION MANAGEMENT TABLE

| INSTRUCTION CODE | INSTRUCTION LENGTH (BYTE) | COMPILATION END FLAG | INTERPRETER EMULATION CODE ADDRESS | OPERAND FIELD | COMPILATION EMULATION CODE MANAGEMENT TABLE ADDRESS |
|---|---|---|---|---|---|
| 0x00 | 4 | CONTINUE | STORAGE ADDRESS OF INTERPRETER EMULATION CODE 332000-256 OF INSTRUCTION 0X00 | bit8-bit15 | STORAGE ADDRESS OF COMPILATION EMULATION CODE MANAGEMENT TABLE 3422-000 OF INSTRUCTION 0X00 |
| 0x01 | 4 | END | STORAGE ADDRESS OF INTERPRETER EMULATION CODE 332001-256 OF INSTRUCTION 0X01 | bit8-bit15 | STORAGE ADDRESS OF COMPILATION EMULATION CODE MANAGEMENT TABLE 3422-001 OF INSTRUCTION 0X01 |
| ... | ... | ... | ... | ... | ... |
| 0xXX | 2 | CONTINUE | STORAGE ADDRESS OF INTERPRETER EMULATION CODE 332XXX-256 OF INSTRUCTION 0XXX | bit8-bit15 | STORAGE ADDRESS OF COMPILATION EMULATION CODE MANAGEMENT TABLE 3422-XXX OF INSTRUCTION 0XXX |
| ... | ... | ... | ... | ... | ... |
| 0xFF | 8 | CONTINUE | STORAGE ADDRESS OF INTERPRETER EMULATION CODE 332255-256 OF INSTRUCTION 0XFF | bit8-bit15 | STORAGE ADDRESS OF COMPILATION EMULATION CODE MANAGEMENT TABLE 3422-255 OF INSTRUCTION 0XFF |

Fig. 6

DATA FOR I/F BETWEEN PROCESSORS ~ 342

3422-000 COMPILATION EMULATION CODE MANAGEMENT TABLE OF INSTRUCTION 0X00

| OPERAND | COMPILATION EMULATION CODE ADDRESS | COMPILATION EMULATION CODE SIZE |
|---|---|---|
| 0x00 | STORAGE ADDRESS OF COMPILATION EMULATION CODE 332000-000 (OPERAND = 0X00) OF INSTRUCTION 0X00 | SIZE OF COMPILATION EMULATION CODE 332000-000 (OPERAND = 0X00) OF INSTRUCTION 0X00 |
| 0x01 | STORAGE ADDRESS OF COMPILATION EMULATION CODE 332000-001 (OPERAND = 0X01) OF INSTRUCTION 0X00 | SIZE OF COMPILATION EMULATION CODE 332000-001 (OPERAND = 0X01) OF INSTRUCTION 0X00 |
| ... | ... | ... |
| 0xFF | STORAGE ADDRESS OF MANAGEMENT TABLE OF COMPILATION EMULATION CODE 332000-255 (OPERAND = 0XFF) OF INSTRUCTION 0X00 | SIZE OF COMPILATION EMULATION CODE 332000-255 (OPERAND = 0XFF) OF INSTRUCTION 0X00 |

...

3422-255 COMPILATION EMULATION CODE MANAGEMENT TABLE OF INSTRUCTION 0XFF

EMULATION DEVICE, EMULATION METHOD, AND RECORDING MEDIUM STORING EMULATION PROGRAM

This application is based upon and claims the benefit of priority from Japanese Patent Application No. 2016-160017, filed on Aug. 17, 2016, the disclosure of which is incorporated herein in its entirety by reference.

TECHNICAL FIELD

The present invention relates to a technology for compiling software that is an execution target of emulation so that the software can be emulated.

BACKGROUND ART

In modern society, the architecture of a computer system rapidly progresses. However, for example, when there is no compatibility between the old and new architectures, the computer system with new architecture cannot use the software resources for the computer system with old architecture just as it is. In such case, the computer system with new architecture can use the software sources for the computer system with old architecture by performing emulation.

For example, because the software resources developed for a mainframe in the past can be used by a current open server by performing emulation, the enormous software resources developed for the mainframe can be effectively utilized. However, when software is executed by emulating the software, the execution speed decreases in comparison with a case in which the software is executed directly. Accordingly, in a case in which the software is executed by emulating the software, a technology to increase the execution speed of the software is awaited.

As a technology related to such technology, in a patent literature 1 (Japanese Patent Application Laid-open Publication No. 2010-140233), there is disclosed an emulation system including a compilation processor and an emulation processor. The compilation processor in this system reads out an instruction from a target code, analyzes it, and generates a host code for emulating the instruction. The emulation processor executes the host code in a compilation mode in which the host code is generated by the compilation processor. The emulation processor reads out the instruction from the next target code, analyzes it, and emulates the instruction in an interpreter mode in which the host code is not generated by the compilation processor.

Further, in a patent literature 2 (Japanese Patent No. 4713820), there is disclosed a program execution control device in which it is determined whether or not a method is not compiled when the method is called in the execution processing of a program. When the method is not compiled, this device executes a byte code of the method in an interpreter processing and also requests the compilation of the method. When the method has been already compiled, this device executes a native code of the method. This device performs the compilation of the method to which the compilation is requested in a task other than the task for executing the instruction such as the execution of the byte code in the interpreter processing or the execution of the native code.

SUMMARY

As disclosed in the patent literature 1 and the patent literature 2, the execution speed of the software that is executed by emulation can be increased by performing both the compilation processing and the interpreter processing to the software that is an execution target. In this case, especially, the execution speed can be largely increased by the compilation processing. However, when the configuration disclosed in patent literature 1 and patent literature 2 is used, the execution speed of the software cannot be sufficiently increased by the compilation processing. Accordingly, a technology to further increase the execution speed of the software by the compilation processing is awaited. A main object of the present invention is to provide an emulation device or the like which can solve such problem.

An emulation device according to one aspect of the present invention includes: a storage unit configured to store information in which instruction information including a type of an instruction and an operand included in emulation-execution-target-software, compiled instruction information obtained by compiling the instruction information capable of being emulated, and information indicating a storage address of the compiled instruction information are associated with; and a generation unit configured to generate compiled software that is compiled for the emulation-execution-target-software capable of being emulated by converting the instruction information into subroutine-read-instruction-information which calls the compiled instruction information associated with the instruction information from the storage address.

From another point of view for achieving the object mentioned above, an emulation method according to one aspect of the present invention includes, in a case that information in which instruction information including a type of an instruction and an operand included in emulation-execution-target-software, compiled instruction information obtained by compiling the instruction information capable of being emulated, and information indicating a storage address of the compiled instruction information are associated with is stored in a storage unit: by an information processing device, generating compiled software that is compiled for the emulation-execution-target-software capable of being emulated by converting the instruction information into subroutine-read-instruction-information which calls the compiled instruction information associated with the instruction information from a storage address.

Further, from another point of view for achieving the object mentioned above, an emulation program according to one aspect of the present invention is a program which causes a computer which is able to access a storage unit storing information in which instruction information including a type of an instruction and an operand included in emulation-execution-target-software, compiled instruction information obtained by compiling the instruction information capable of being emulated, and information indicating a storage address of the compiled instruction information are associated with, to perform: a generation processing for generating the complied software that is compiled for the emulation-execution-target-software to be able to be emulated by converting the instruction information into subroutine-read-instruction-information which calls the compiled instruction information associated with the instruction information from the storage address.

Moreover, the present invention can be realized by a computer-readable non-transitory recording medium storing an emulation program (computer program).

The present invention can increase the execution speed of the software that is executed by emulation.

BRIEF DESCRIPTION OF THE DRAWINGS

Exemplary features and advantages of the present invention will become apparent from the following detailed description when taken with the accompanying drawings in which:

FIG. 4 is a figure showing an exemplary example of a structure of a request buffer 3420 according to a first example embodiment of the present invention;

FIG. 5 is a figure showing an exemplary example of a structure of an instruction information management table 3421 according to a first example embodiment of the present invention;

FIG. 6 is a figure showing an exemplary example of a structure of compilation emulation code management tables 3422-000 to 3422-255 according to a first example embodiment of the present invention;

EXEMPLARY EMBODIMENT

An example embodiment of the present invention will be described in detail below with reference to a drawing.

First Example Embodiment

Figure 1:
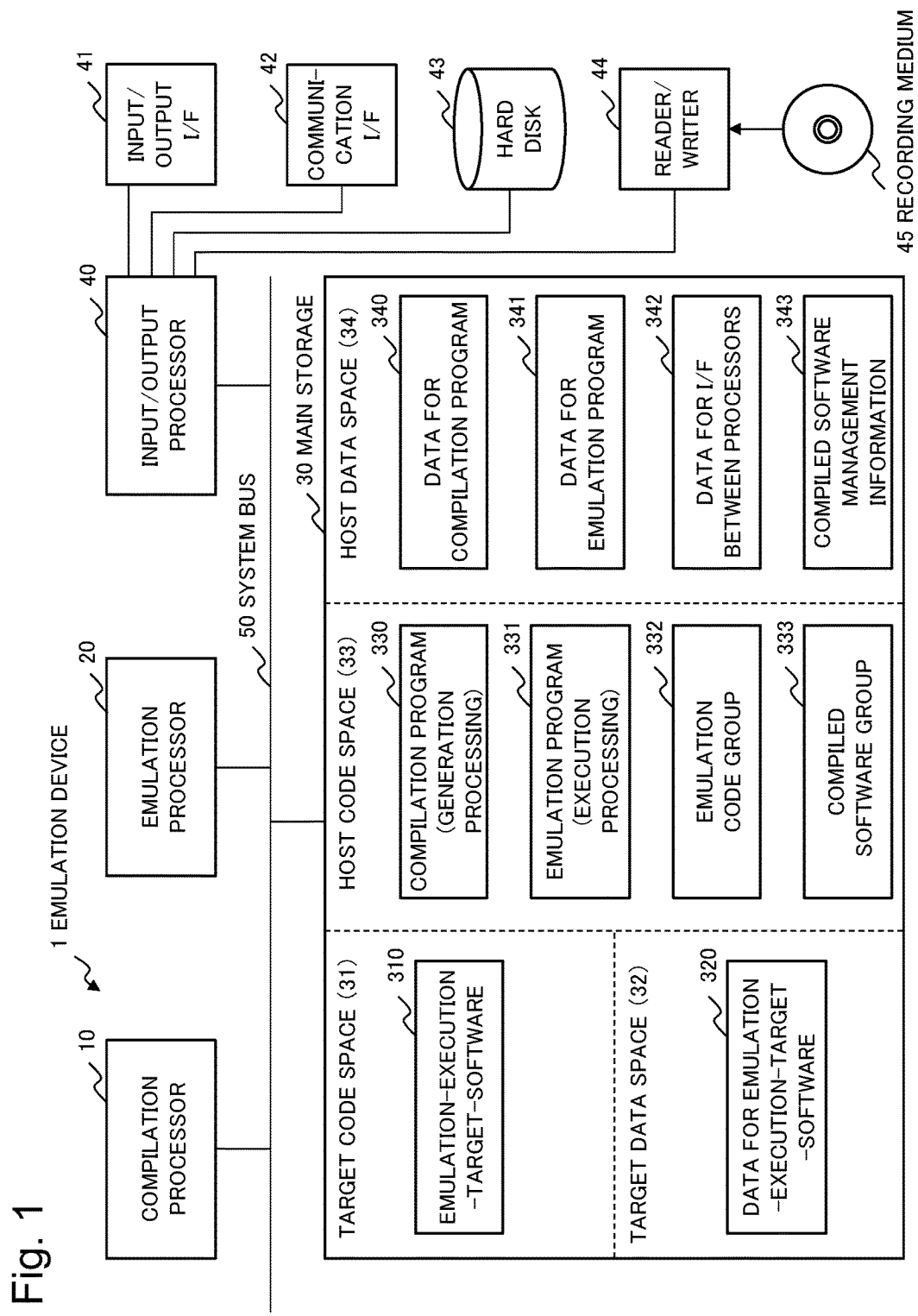
FIG. 1 is a block diagram showing a configuration of an emulation device 1 according to a first example embodiment of the present invention.

FIG. 1 is a block diagram conceptually showing a configuration of an emulation device (emulator) 1 according to a first example embodiment of the present invention. The emulation device 1 is an information processing device such as a server device or the like which can emulate software.

The emulation device 1 according to this example embodiment is composed of the following components:
a compilation processor 10,
an emulation processor 20,
a main storage 30,
an input/output processor 40,
a system bus 50,
an input/output I/F (interface) 41,
a communication I/F 42,
a hard disk 43, and
a reader/writer 44.

As shown in FIG. 1, the compilation processor 10, the emulation processor 20, and the input/output processor 40 are connected to the main storage 30 via the system bus 50 so as to be communicable, read out a computer program stored in the main storage 30, and execute it. The compilation processor 10, the emulation processor 20, and the input/output processor 40 read out data required for the execution of the computer program and write an execution result in the main storage 30. The main storage 30 is a readable-writable storage device that is composed of for example, a RAM (Random Access Memory) or the like.

The input/output processor 40 is connected to the input/output I/F 41, the communication I/F 42, the hard disk 43, and the reader/writer 44 so as to be communicable. The input/output I/F 41 is a device such as a keyboard, a mouse, a monitor device, or the like which inputs and outputs information. The input/output processor 40 reads a computer program and data recorded in various recording media 45 such as a CD-ROM and the like via the reader/writer 44 and then stores the read computer program and data in the main storage 30. The input/output processor 40 may download the computer program and data to be stored in the main storage 30 from the outside via the communication I/F 42 connected to a communication line such as the Internet or the like.

In this present application, an instruction code (in other words, an instruction code that can be executed by an information processing device with architecture different from that of the emulation device 1) included in software that is the target of emulation performed by the emulation device 1 is defined as a target code. In this present application, the instruction code which can be executed by the emulation device 1 without converting it is defined as a host code.

The main storage 30 according to this example embodiment includes a target code space 31, a target data space 32, a host code space 33, and a host data space 34 as an address space (a storage area).

The target code space 31 is the address space of the main storage 30 in which the software (program) composed of the target code is stored and emulation-execution-target-software 310 is stored therein. The emulation-execution-target-software 310 is the software that is the target of emulation performed by the emulation device 1.

The target data space 32 is the address space of the main storage 30 in which data composed of the target code is stored and data 320 for emulation-execution-target-software is stored therein. The data 320 for emulation-execution-target-software is data inputted or outputted when the emulation-execution-target-software 310 is executed.

The host code space 33 is the address space of the main storage 30 in which software composed of the host code is stored and a compilation program 330, an emulation program 331, an emulation code group 332, and a compiled software group 333 are stored therein. The compilation program 330 is a program used for a processing (generation processing) for generating software that is a compilation result obtained by compiling the emulation-execution-target-software 310 and executed by the compilation processor 10. The emulation program 331 is a program used for a processing (execution processing) for emulating the emulation-execution-target-software 310 and executed by the emulation processor 20.

The emulation code group 332 is a subroutine program group written in the host code for each instruction information included in the emulation-execution-target-software 310. The emulation code group 332 further includes a program written in the host code used when the emulation-execution-target-software 310 is emulated by a processing (interpreter processing) using an interpreter method. The compiled software group 333 is a program group that is a result obtained by compiling at least a part of the emulation-execution-target-software 310 so that it can be emulated.

The host data space 34 is the address space of the main storage 30 in which data composed of the host code is stored and data 340 for compilation program, data 341 for emulation program, data 342 for I/F (interface) between processors, and compiled software management information 343 are stored therein. The data 340 for compilation program is data inputted or outputted when the compilation program 330 is executed. The data 341 for emulation program is data inputted or outputted when the emulation program 331 is executed.

The data 342 for I/F between processors is the data inputted and outputted between the compilation processor 10 and the emulation processor 20 when these processors cooperate with each other and emulate the emulation-execution-target-software 310. The compiled software management information 343 is information (data) for managing each compiled software included in the compiled software group 333.

Each of the software and data stored in the main storage 30 mentioned above will be described later as needed.

The emulation processor 20 and the compilation processor 10 according to the first example embodiment will be described in detail below.

(Emulation Processor 20)

The emulation processor 20 according to this example embodiment reads out the emulation program 331 from the main storage 30, executes it, and emulates the emulation-execution-target-software 310.

Figure 2:
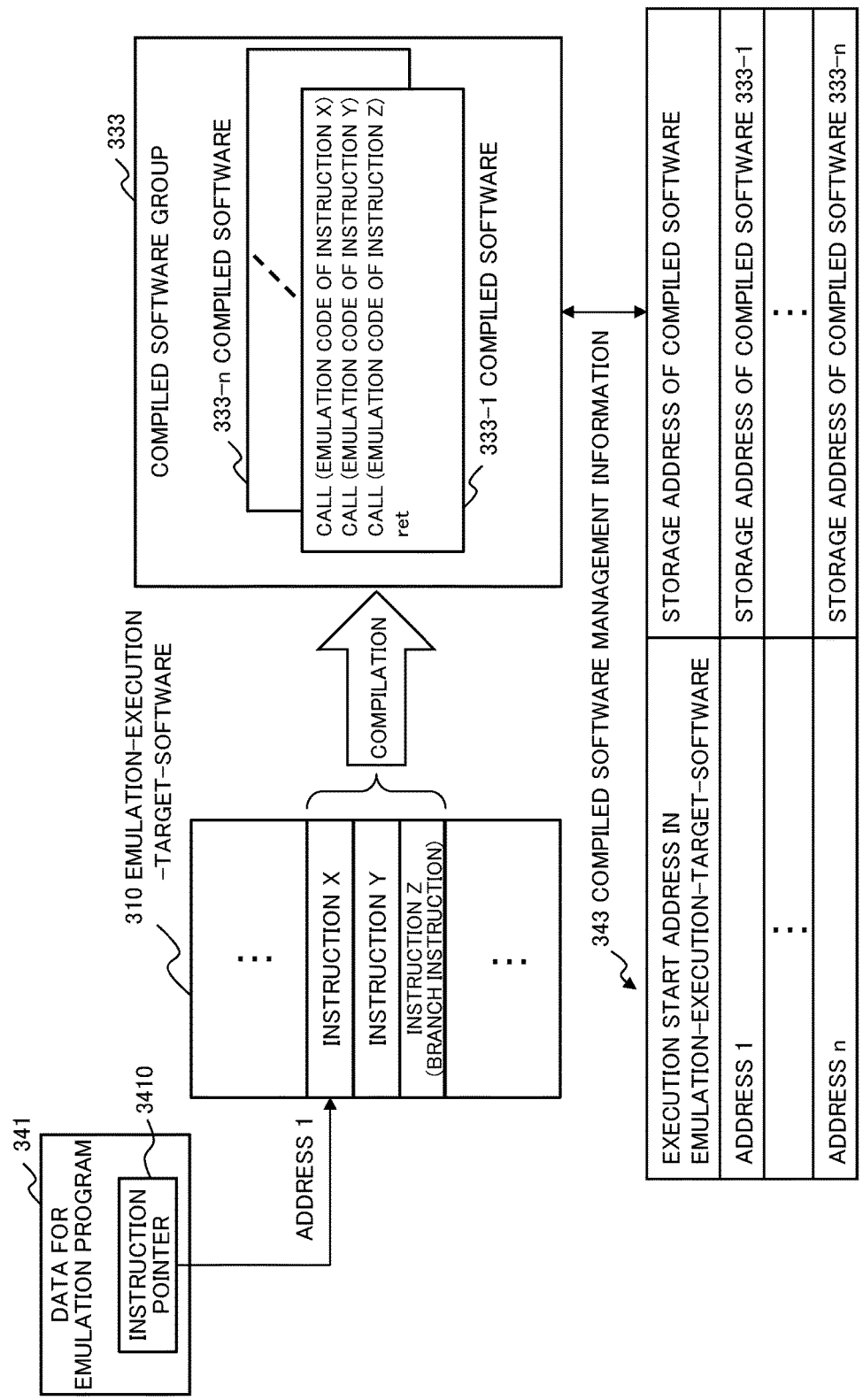
FIG. 2 is a figure showing an exemplary example of a relationship between information to be referred and information generated by an emulation device 1 according to a first example embodiment of the present invention when the emulation device 1 performs emulation.

FIG. 2 is a figure showing an exemplary example of a relationship between information to be referred and information generated by the emulation device 1 according to this example embodiment when the emulation device 1 performs emulation. The emulation processor 20 obtains the instruction information from a memory area corresponding to the address indicated by an instruction pointer 3410 in the emulation-execution-target-software 310, emulates the obtained instruction information, and executes it. The instruction pointer 3410 is a pointer showing a current execution place (address) in the emulation-execution-target-software 310 used when the emulation processor 20 emulates the emulation-execution-target-software 310. The instruction pointer 3410 is data included in the data 341 for emulation program.

In this example embodiment, an instruction sequence including one or more instructions included in the emulation-execution-target-software 310 is compiled by the compilation processor 10. A result of the compilation is stored in the main storage 30 as the compiled software group 333. In an example shown in FIG. 2, the compilation result obtained by compiling the instruction sequence composed of an instruction X, an instruction Y, and an instruction Z that are sequential instructions included in the emulation-execution-target-software 310 is stored in the main storage 30 as compiled software 333-1. In an example shown in FIG. 2, the compiled software group 333 includes sets of compiled software 333-1 to 333-$n$ ($n$ is an arbitrary natural number).

When the emulation processor 20 emulates the instruction sequence composed of the instruction X, the instruction Y, and the instruction Z exemplarily shown in FIG. 2, the emulation processor 20 reads out the compiled software 333-1 from the main storage 30 and executes the read compiled software 333-1.

The emulation processor 20 may emulate the emulation-execution-target-software 310 by an interpreter method in which the emulation-execution-target-software 310 is emulated by analyzing the instruction included in the emulation-execution-target-software 310 one by one sequentially. Accordingly, when the compiled software 333-1 is not stored in the main storage 30, the emulation processor 20 emulates the instruction sequence composed of the instruction X, the instruction Y, and the instruction Z exemplarily shown in FIG. 2 by the interpreter method.

The compiled software management information 343 exemplarily shown in FIG. 2 is information in which the storage address of each of the sets of compiled software 331-1 to 333-$n$ and an execution start address in the emulation-execution-target-software 310 are associated with each other for each of the sets of compiled software 331-1 to 333-$n$. For example, the compiled software management information 343 exemplarily shown in FIG. 2 indicates the address at which the compiled software 333-1 related to the instruction sequence whose first instruction is the instruction X located at an address 1 in the emulation-execution-target-software 310 is stored. Accordingly, the emulation processor 20 can confirm whether or not the compiled software corresponding to the instruction sequence which starts from the address indicated by the instruction pointer 3410 in the emulation-execution-target-software 310 is stored in the main storage 30 as the compiled software group 333 by referring to the compiled software management information 343.

Figure 3:
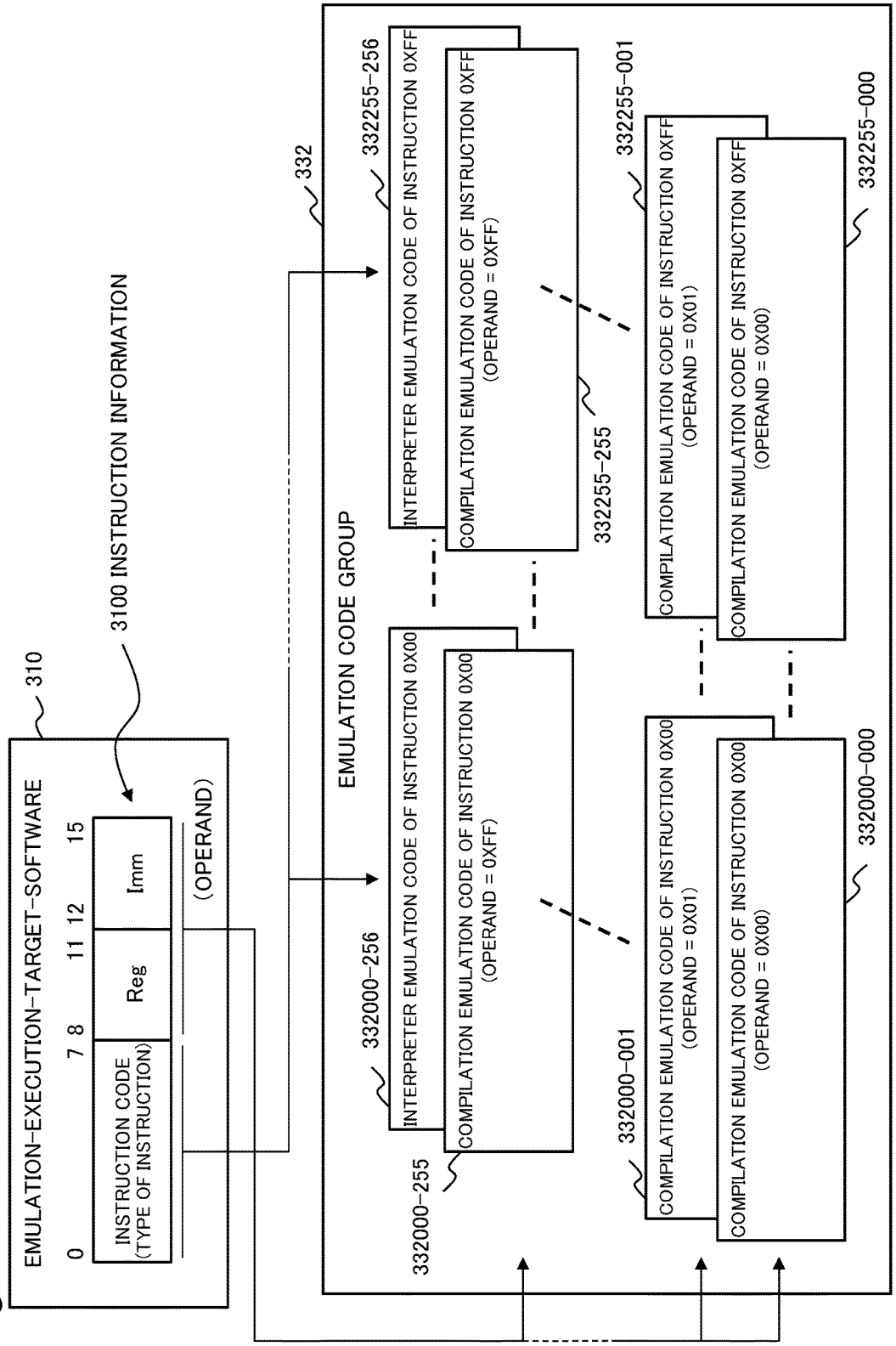
FIG. 3 is a figure showing an exemplary example of a relationship between instruction information 3100 and an emulation code group 332 in an emulation device 1 according to a first example embodiment of the present invention.

FIG. 3 is a figure showing an exemplary example of a relationship between instruction information 3100 and the emulation code group 332 in the emulation device 1 according to this example embodiment. The instruction information 3100 is information indicating a content of each instruction (for example, the instruction X, the instruction Y, the instruction Z, and the like exemplarily shown in FIG. 2) included in the emulation-execution-target-software 310. As exemplarily shown in FIG. 3, the instruction information 3100 includes an instruction code (type of an instruction), Reg (register), and Imm (immediate value). For example, the instruction code, the Reg, and the Imm are 8-bit information, 4-bit information, and 4-bit information, respectively. The Reg and the Imm are information (operands) that are the targets processed according to the instruction. The Reg is information for identifying a register in the processor.

The emulation code group 332 is a program (software) group composed of the host code used when the emulation processor 20 emulates the instruction included in the emulation-execution-target-software 310. The emulation code group 332 includes compilation emulation codes 332000-000 to 332000-255 of an instruction 0x00 and an interpreter emulation code 332000-256 of the instruction 0x00 with respect to an instruction code "0x00". Where, "0x" shows that the value is represented as a hexadecimal value. The emulation code group 332 includes compilation emulation codes 332255-000 to 332255-255 of an instruction 0xFF and an interpreter emulation code 332255-256 of the instruction 0xFF with respect to an instruction code "0xFF". Similarly, the emulation code group 332 also includes the compilation emulation code and the interpreter emulation code with respect to the instruction codes "0x01" to "0xFE".

The compilation emulation code 332000-000 of the instruction 0x00 is the compiled program for emulating the instruction information 3100 of which the instruction code is "0x00" and the operand is "0x00". The compilation emulation code 332000-255 of the instruction 0x00 is the compiled program for emulating the instruction information 3100 of which the instruction code is "0x00" and the operand is "0xFF". The interpreter emulation code 332000-256 of the instruction 0x00 is a program for emulating the instruction information 3100 of which the instruction code is "0x00" by the interpreter method. The compilation emulation code and the interpreter emulation code related to the instructions 0x01 to 0xFF included in the emulation code group 332 are the programs for emulating the instruction information 3100 like the emulation code related to the instruction 0x00 mentioned above.

When the emulation processor 20 executes the compiled software 333-1 exemplarily shown in FIG. 2, the emulation processor 20 reads out one of the compilation emulation codes in the emulation code group 332 specified by a Call instruction (subroutine read instruction) which reads out the compilation emulation code related to the instruction X and execute it. After the emulation processor 20 executes the same processing to the instruction Y and the instruction Z, the emulation processor 20 executes a ret instruction (return instruction) to end the execution of the compiled software 333-1.

The compiled software corresponding to the instruction sequence which starts from the address indicated by the instruction pointer 3410 in the emulation-execution-target-software 310 is not stored in the main storage 30 as the compiled software group 333, the emulation processor 20 instructs the compilation processor 10 to compile the instruction sequence. The emulation processor 20 transmits this instruction via a request buffer 3420 included in the data 342 for I/F between processors shown in FIG. 1.

FIG. 4 is a figure conceptually showing an exemplary example of a structure of the request buffer 3420 according to this example embodiment. The request buffer 3420 has eight entries 0 to 7, associates "a compilation start address in the emulation-execution-target-software 310" with "a validity flag", and stores them for each entry. Further, the number of the entries provided in the request buffer 3420 is not limited to eight.

The validity flag in the request buffer 3420 is information indicating whether or not the information stored in the entry is valid. When the validity flag indicates "0xFF", the information is valid. When the validity flag indicates "0x00", the information is invalid (in other words, the entry is unused).

For example, when the emulation processor 20 instructs the compilation processor 10 to compile the instruction sequence of which a first instruction is the instruction X exemplarily shown in FIG. 2, the emulation processor 20 registers the address at which the instruction X is located in the emulation-execution-target-software 310 in one of the unused entries of which the validity flag indicates "0x00" and sets the validity flag of this entry to "0xFF". When the information stored in all the entries in the request buffer 3420 are valid, the emulation processor 20 does not instruct the compilation processor 10 to compile the instruction sequence.

When the compiled software corresponding to the instruction sequence which starts from the address indicated by the instruction pointer 3410 in the emulation-execution-target-software 310 is not stored in the main storage 30 as the compiled software group 333, the emulation processor 20 emulates the instruction sequence by the interpreter method. In this processing, the emulation processor 20 refers to an instruction information management table 3421 included in the data 342 for I/F between processors.

FIG. 5 is a figure conceptually showing an exemplary example of a structure of the instruction information management table 3421 according to this example embodiment. In the instruction information management table 3421, the "instruction code", an "instruction length", a "compilation end flag", an "interpreter emulation code address", an "operand field", and a "compilation emulation code management table address" are associated with each other. For example, when the instruction code of the instruction X exemplarily shown in FIG. 2 is "0xXX", the emulation processor 20 reads the interpreter emulation code 332XXX-256 from the storage address of the interpreter emulation code 332XXX-256 of the instruction 0xXX indicated by the instruction information management table 3421 and executes it. The instruction information management table 3421 exemplarily shown in FIG. 5 shows that the instruction length of the instruction X is 2 bytes. Accordingly, the emulation processor 20 adds 2 bytes to a value indicated by the instruction pointer 3410 and emulates the instruction Y that is the subsequent instruction of the instruction X.

(Compilation Processor 10)

The compilation processor 10 according to this example embodiment shown in FIG. 1 compiles the instruction sequence included in the emulation-execution-target-software 310 according to the information registered in the request buffer 3420 by the emulation processor 20. For example, the compilation processor 10 may periodically perform polling to the request buffer 3420. In this case, it is not necessary for the emulation processor 20 to communicate with the compilation processor 10 to request the execution of a compilation processing. The compilation processor 10 may return to an idle state after performing all the compilation processing requested by the compilation request registered in the request buffer 3420. In this case, it is necessary for the emulation processor 20 to communicate with the compilation processor 10 to request the execution of the compilation processing.

The compilation processor 10 reads out the instruction in the emulation-execution-target-software 310 that is indicated by the compilation start address stored in the entry of which the validity flag indicates "0xFF" in the request buffer 3420 exemplarily shown in FIG. 4 and compiles the instruction. In this case, the compilation processor 10 refers to the instruction information management table 3421 exemplarily shown in FIG. 5. For example, when the compilation processor 10 compiles the instruction X whose instruction code is "0xXX", the compilation processor 10 obtains the "storage address of a compilation emulation code management table 3422-XXX related to the instruction 0xXX" indicated by the instruction information management table 3421.

FIG. 6 is a figure conceptually showing an exemplary example of a structure of the compilation emulation code management tables 3422-000 to 3422-255 according to this example embodiment. The compilation emulation code management table 3422-000 is a table related to the instruction whose instruction code is "0x00" and the compilation emulation code management table 3422-255 is a table related to the instruction whose instruction code is "0xFF". In the compilation emulation code management tables 3422-000 to 3422-255, the "operand", the "compilation emulation code address", and the "compilation emulation code size" are associated with each other.

When the compilation processor 10 compiles the instruction X, the compilation processor 10 obtains the storage address of the compilation emulation code 332XXX-i (i is an integer from 0 to 255 specified by the operand) of the instruction 0xXX indicated by the compilation emulation code management table 3422-XXX that corresponds to the value indicated by the operand of the instruction X. The compilation processor 10 generates the Call instruction which calls the obtained storage address as the compiled software 333-1 exemplarily shown in FIG. 2.

The compilation processor 10 refers to the instruction information management table 3421 exemplarily shown in FIG. 5 and confirms a "compilation end flag" of the instruction 0xXX. The compilation end flag is a flag indicating whether or not the subsequent instruction has to be compiled. When the compilation end flag indicates "CONTINUE", it shows that the subsequent instruction has to be compiled. When the compilation end flag indicates "END", it shows that the compilation ends after compiling the instruction without compiling the subsequent instruction. In general, the compilation end flag related to a branch instruction is set to "END" and the compilation end flag related to the instruction other than the branch instruction is set to "CONTINUE". After the compilation processor 10 confirms that the "compilation end flag" of the instruction 0xXX indicates "CONTINUE", the compilation processor 10 adds 2 bytes that is the instruction length of the instruction 0xXX to the compilation start address. After this processing, the compilation processor 10 reads out the instruction Y included in the emulation-execution-target-software 310 and compiles the instruction Y by using the method that is the same as that used for the instruction X.

As exemplarily shown in FIG. 2, because the instruction Y is not the branch instruction, the compilation processor 10 reads out the instruction Z that is the subsequent instruction of the instruction Y and compiles the instruction Z by using the method that is the same as that used for the instruction X and the instruction Y. As exemplarily shown in FIG. 2, because the instruction Z is the branch instruction, the compilation processor 10 confirms that the "compilation end flag" related to the instruction Z indicates "END" in the instruction information management table 3421. The compilation processor 10 adds the Call instruction which calls the storage address of the compilation emulation code related to the instruction Z to the compiled software 333-1. Next, the compilation processor 10 adds the ret instruction (return instruction) to the compiled software 333-1 as the subsequent instruction of the Call instruction related to the instruction Z and ends the processing for generating the compiled software 333-1.

The compilation processor 10 stores the generated compiled software 333-1 in the main storage 30, associates the storage address with the address of the instruction X in the emulation-execution-target-software 310, and registers them in the compiled software management information 343 exemplarily shown in FIG. 2. The compilation processor 10 exclusively updates the compiled software management information 343 between the compilation processor 10 and another processor in the emulation device 1. For this purpose, the compilation processor 10 locks the compiled software management information 343, then performs the update processing, and unlocks the compiled software management information 343 after completing the update processing.

Next, the operation (processing) of the emulation device 1 according to the first example embodiment will be described in detail with reference to flowcharts shown in FIGS. 7 to 9.

Figure 7A:
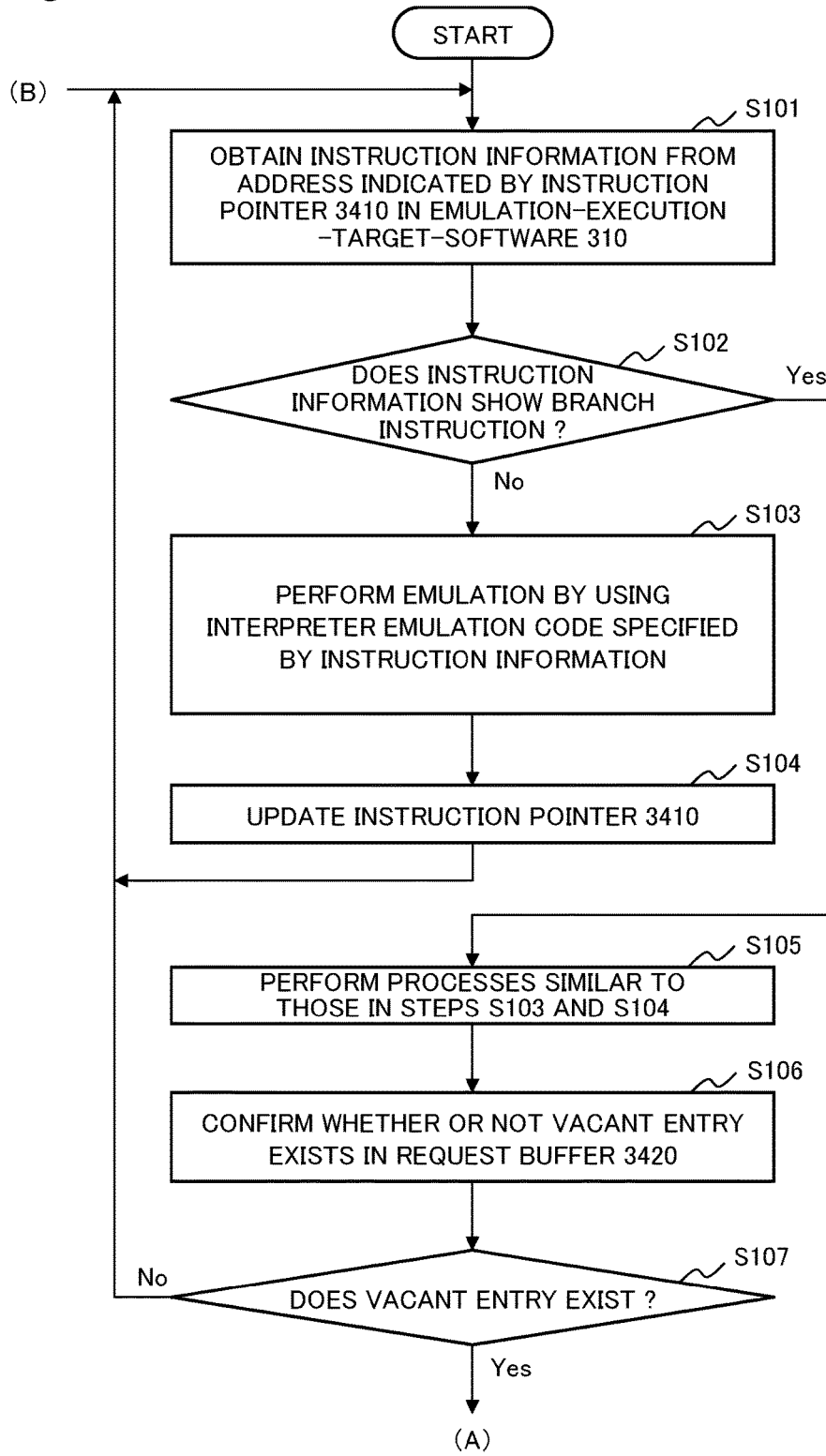
FIG. 7A is a flowchart (1/2) showing an operation of an emulation processor 20 in an emulation device 1 according to a first example embodiment of the present invention.
Figure 7B:
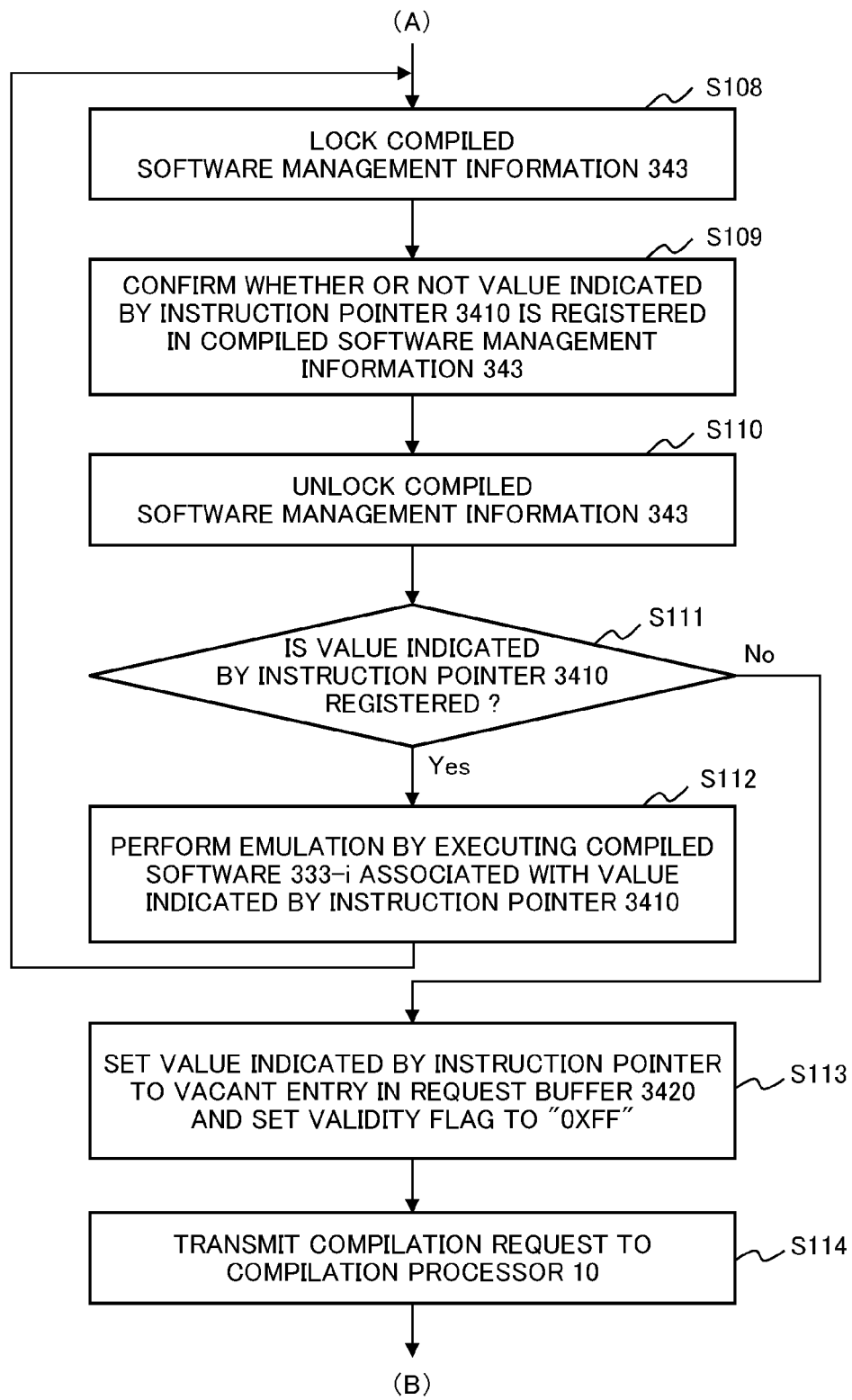
FIG. 7B is a flowchart (2/2) showing an operation of an emulation processor 20 in an emulation device 1 according to a first example embodiment of the present invention.

FIG. 7A and FIG. 7B are flowcharts showing the operation of the emulation processor 20 according to this example embodiment.

The emulation processor 20 obtains the instruction information from a memory area corresponding to the address indicated by the instruction pointer 3410 in the emulation-execution-target-software 310 (step S101). When the instruction information shows that the instruction is not the branch instruction (No in step S102), the emulation processor 20 performs the emulation by using the interpreter emulation code specified by the instruction information (step S103). The emulation processor 20 updates the instruction pointer 3410 (step S104) and the processing goes back to step S101.

When the instruction information shows that the instruction is the branch instruction (Yes in step S102), the emulation processor 20 performs the processing similar to those in steps S103 and S104 (step S105). The emulation processor 20 confirms whether or not a vacant entry (unused entry) exists in the request buffer 3420 (step S106). When the vacant entry does not exist (No in step S107), the processing goes back to step S101.

When the vacant entry exists (Yes in step S107), the emulation processor 20 locks the compiled software management information 343 (step S108). The emulation processor 20 confirms whether or not the value indicated by the instruction pointer 3410 is registered in the compiled software management information 343 (step S109). The emulation processor 20 unlocks the compiled software management information 343 (step S110).

When the value indicated by the instruction pointer 3410 is registered (Yes in step S111), the emulation processor 20 performs the emulation by executing the compiled software 333-i associated with the value indicated by the instruction pointer 3410 (step S112) and the processing goes back to step S108.

When the value indicated by the instruction pointer 3410 is not registered (No in step S111), the emulation processor 20 sets the value indicated by the instruction pointer to the vacant entry in the request buffer 3420 as the compilation start address and sets the validity flag to "0xFF" (step S113). The emulation processor 20 transmits the compilation request to the compilation processor 10 (step S114) and the processing goes back to step S101.

Figure 8A:
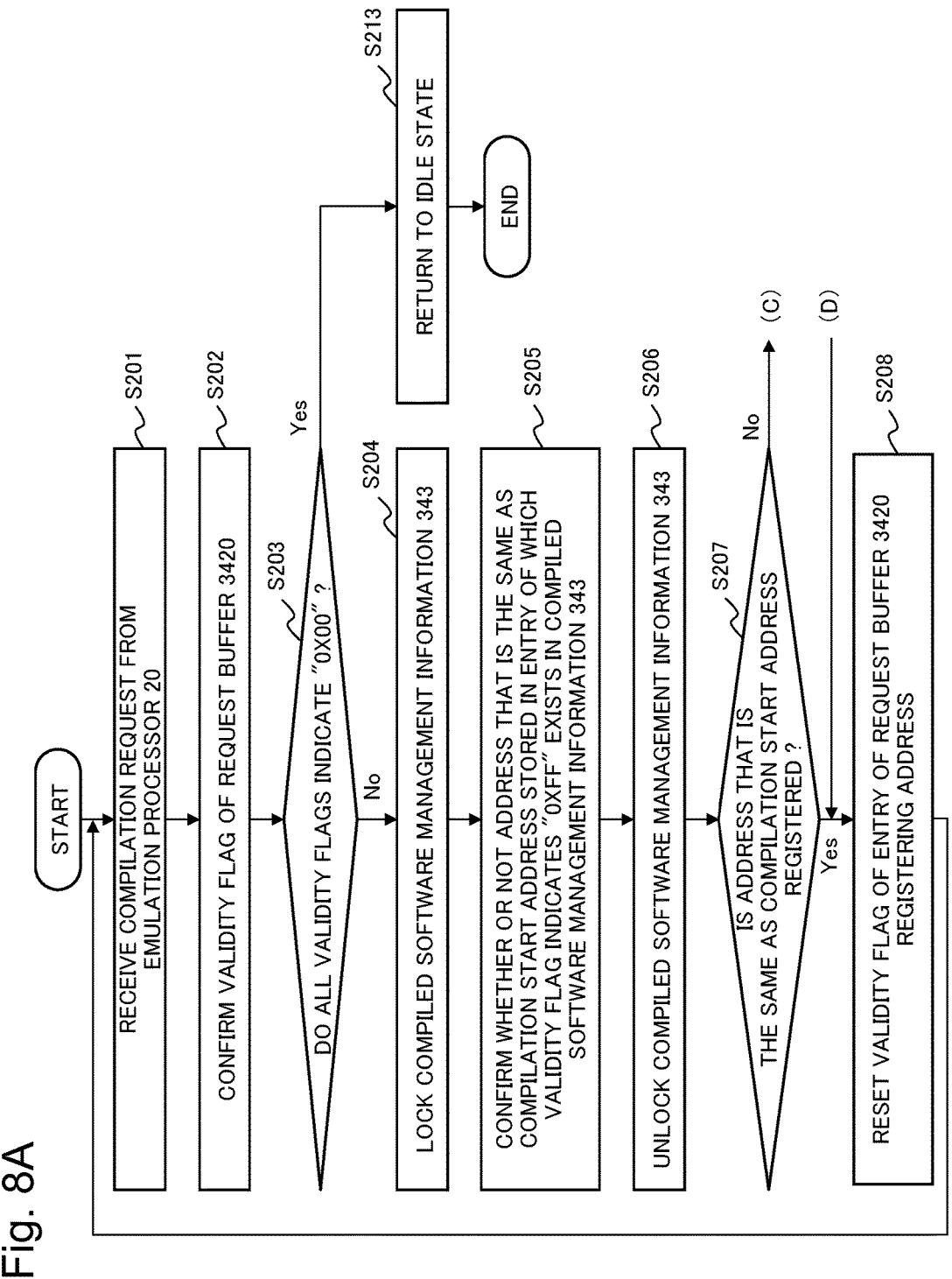
FIG. 8A is a flowchart (1/2) showing an entire operation of a compilation processor 10 in an emulation device 1 according to a first example embodiment of the present invention.
Figure 8B:
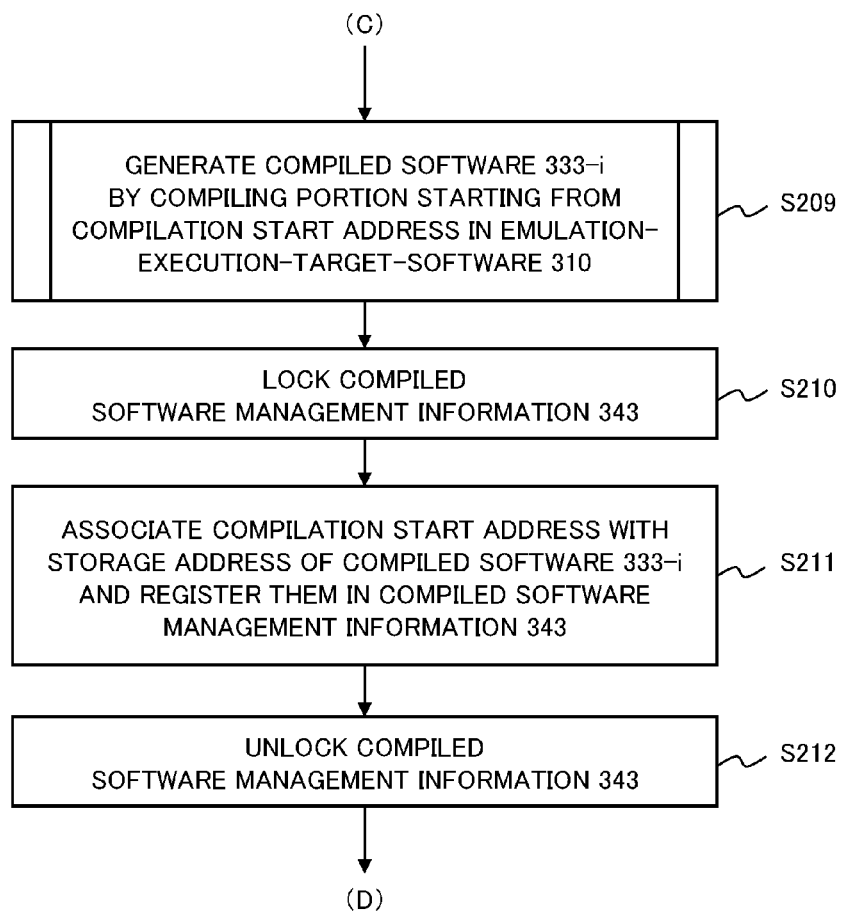
FIG. 8B is a flowchart (2/2) showing an entire operation of a compilation processor 10 in an emulation device 1 according to a first example embodiment of the present invention.

FIGS. 8A and 8B are flowcharts showing the entire operation of the compilation processor 10 in the emulation device 1 according to this example embodiment.

The compilation processor 10 receives the compilation request from the emulation processor 20 (step S201). The compilation processor 10 confirms the validity flag of the request buffer 3420 (step S202). When all the validity flags indicate "0x00" (Yes in step S203), the compilation processor 10 returns to the idle state (step S213) and all the processing end.

When at least one of the validity flags does not indicate "0x00" (in other words, at least one of the validity flags indicates "0xFF") (No in step S203), the compilation processor 10 locks the compiled software management information 343 (step S204). The compilation processor 10 confirms whether or not the address that is the same as the compilation start address stored in the entry of which the validity flag indicates "0xFF" exists in the compiled software management information 343 (step S205). The compilation processor 10 unlocks the compiled software management information 343 (step S206).

When the address that is the same as the compilation start address is registered in the compiled software management information 343 (Yes in step S207), the compilation processor 10 resets the validity flag of the entry of the request buffer 3420 storing the address (step S208) and the processing goes back to step S201.

When the address that is the same as the compilation start address is not registered in the compiled software management information 343 (No in step S207), the compilation processor 10 generates the compiled software 333-*i* obtained by compiling the portion starting from the compilation start address in the emulation-execution-target-software 310 (step S209). The compilation processor 10 locks the compiled software management information 343 (step S210). The compilation processor 10 associates the compilation start address with the storage address of the compiled software 333-*i* and registers them in the compiled software management information 343 (step S211). The compilation processor 10 unlocks the compiled software management information 343 (step S212) and the processing goes back to step S208.

Figure 9A:
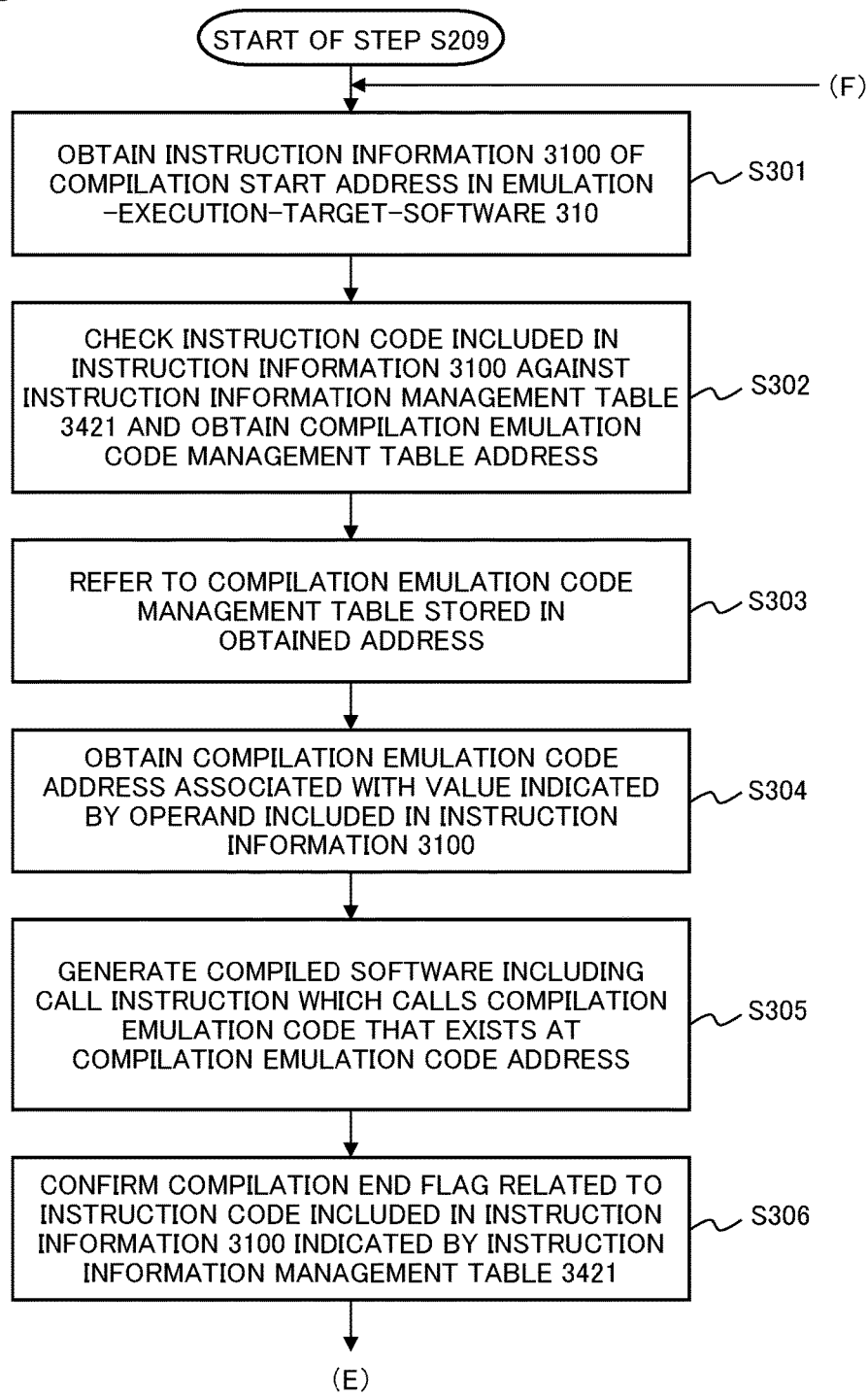
FIG. 9A is a flowchart (1/2) showing a detailed operation in which compiled software is generated by a compilation processor 10 in an emulation device 1 according to a first example embodiment of the present invention.
Figure 9B:
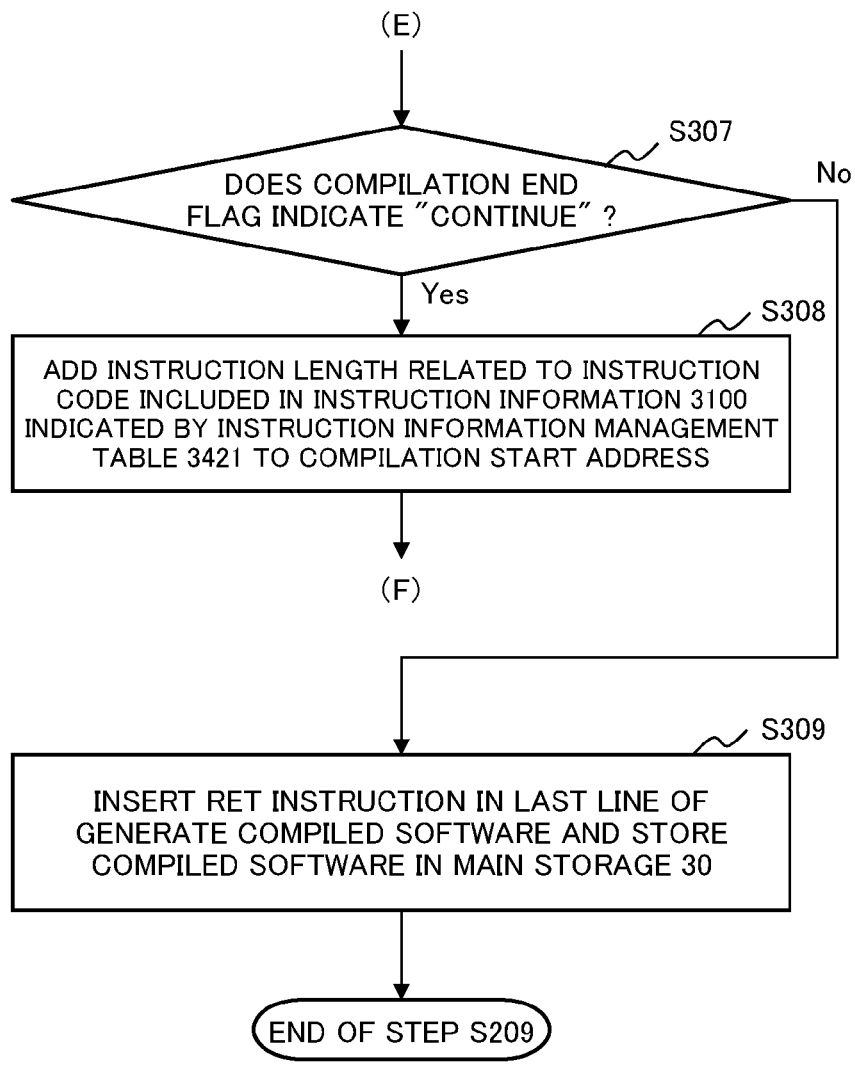
FIG. 9B is a flowchart (2/2) showing a detailed operation in which compiled software is generated by a compilation processor 10 in an emulation device 1 according to a first example embodiment of the present invention.

FIGS. 9A and 9B are flowcharts showing a detailed operation (of step S209 in FIG. 8) in which the compiled software is generated by the compilation processor 10 in the emulation device 1 according to this example embodiment.

The compilation processor 10 obtains the instruction information 3100 of the compilation start address in the emulation-execution-target-software 310 (step S301). The compilation processor 10 checks the instruction code included in the instruction information 3100 against the instruction information management table 3421 and obtains the compilation emulation code management table address (step S302). The compilation processor 10 refers to the compilation emulation code management table stored in the obtained address (step S303).

The compilation processor 10 obtains the compilation emulation code address associated with the value indicated by the operand included in the instruction information 3100 (step S304). The compilation processor 10 generates the compiled software 333-*i* including the Call instruction which calls the compilation emulation code that exists at the compilation emulation code address (step S305). The compilation processor 10 confirms the compilation end flag related to the instruction code included in the instruction information 3100 indicated by the instruction information management table 3421 (step S306).

When the compilation end flag indicates "CONTINUE" (Yes in step S307), the compilation processor 10 adds the instruction length related to the instruction code included in the instruction information 3100 indicated by the instruction information management table 3421 to the compilation start address (step S308) and the processing goes back to step S301. When the compilation end flag does not indicate "CONTINUE" (in other words, it indicate "END") (No in step S307), the compilation processor 10 inserts the ret instruction in the last line of the generated compiled software and stores the compiled software in the main storage 30 (step S309). The processing in step S209 ends.

The emulation device 1 according to this example embodiment can increase the execution speed of the software that is executed by emulation. This is because the main storage 30 and the compilation processor 10 have the following function. Namely, the instruction information that is an emulation execution target, the emulation code group 332, and the storage address of the emulation code group 332 are associated with and stored in the main storage 30. The compilation processor 10 generates the compiled software group 333 of which the emulation execution target is compiled so that it can be emulated by converting the instruction information into subroutine-read-instruction-information which calls the emulation code. The subroutine-read-instruction-information is the instruction information which calls the emulation code associated with the instruction information 3100.

The effect realized by the emulation device 1 according to this example embodiment will be described in detail below.

A technology in which the execution speed of the software that is executed by emulation can be increased by performing both the compilation processing and the interpreter processing to the software that is the execution target of the emulation is known. In this technology, when the compilation processing is performed by copying the emulation code provided in advance for each instruction that is the compilation target whose size is for example, about tens of bytes for each instruction, a large amount of data has to be copied and whereby, a problem in which the compilation processing takes a long time occurs. Namely, when the emulation is performed, the execution speed of the compilation processing has to be increased.

In order to solve such problem, in the emulation device 1 according to this example embodiment, the instruction information 3100 including the type of an instruction and the operand included in the emulation-execution-target-software 310, the emulation code group 332 obtained by compiling the instruction information 3100 so that it can be emulated, and information indicating the storage address of the emulation code group 332 are associated with and stored in the main storage 30. The compilation processor 10 generates the compiled software group 333 of which the emulation-execution-target-software 310 is compiled so that it can be emulated by converting the instruction information 3100 into the subroutine-read-instruction-information which calls the emulation code associated with the instruction information 3100 from the storage address. Namely, the emulation device 1 performs the compilation processing by converting the instruction that is a compilation target into the subroutine read instruction which reads out the emulation code without copying the emulation code for each instruction that is the compilation target. Accordingly, in the emulation device 1 according to this example embodiment, by avoiding a long copy time required for copying the emulation code, the execution speed of the software that is executed by emulation can be increased.

Further, the emulation code group 332 according to this example embodiment is a code group generated on the basis of the value indicated by the type of an instruction and the value indicated by the operand included in the instruction information 3100. Namely, because the emulation code group 332 is the code that is optimally compiled on the basis of both the value indicated by the type of the instruction and the value indicated by the operand, the execution speed of the software can be increased in comparison with a case in which the emulation code group 332 is the code that is compiled on the basis of only the value indicated by the type of the instruction. Accordingly, the emulation device 1 according to this example embodiment can increase the execution speed of the software that is executed by emulation.

Further, the compilation processor 10 according to this example embodiment generates one compiled software 333-i for each instruction sequence in which the branch instruction is included as the last instruction in the emulation-execution-target-software 310. Because the instructions included in the instruction sequence are executed in an address order in the emulation-execution-target-software 310, these instructions can be integrated as one compiled software. Accordingly, the emulation device 1 according to this example embodiment can efficiently generate the compiled software group 333.

Further, the request buffer 3420 having a plurality of entries is stored in a host data space 34 in the main storage 30 according to this example embodiment as the data 342 for I/F between processors. When the emulation processor 20 instructs the compilation processor 10 to perform the compilation, the emulation processor 20 registers the compilation start address in the emulation-execution-target-software 310 in one of the vacant entries and sets the validity flag of this entry to "valid". The compilation processor 10 starts to perform the compilation processing from the compilation start address registered in the entry whose validity flag indicates "valid". Namely, the compilation processor 10 can perform the compilation processing asynchronously and concurrently with the emulation execution processing performed by the emulation processor 20. As a result, the emulation device 1 according to this example embodiment can increase the execution speed of the software that is executed by emulation.

Further, the emulation device 1 according to this example embodiment includes the compilation processor 10 which performs the generation processing by executing the compilation program 330 and the emulation processor 20 which performs the execution processing by executing the emulation program 331. However, the configuration for realizing the emulation device 1 is not limited to the above-mentioned configuration. For example, the emulation device 1 may include a generation unit (generation means) that is dedicated hardware for performing the generation processing and an execution unit (execution means) that is dedicated hardware for performing the execution processing.

Second Example Embodiment

Figure 10:
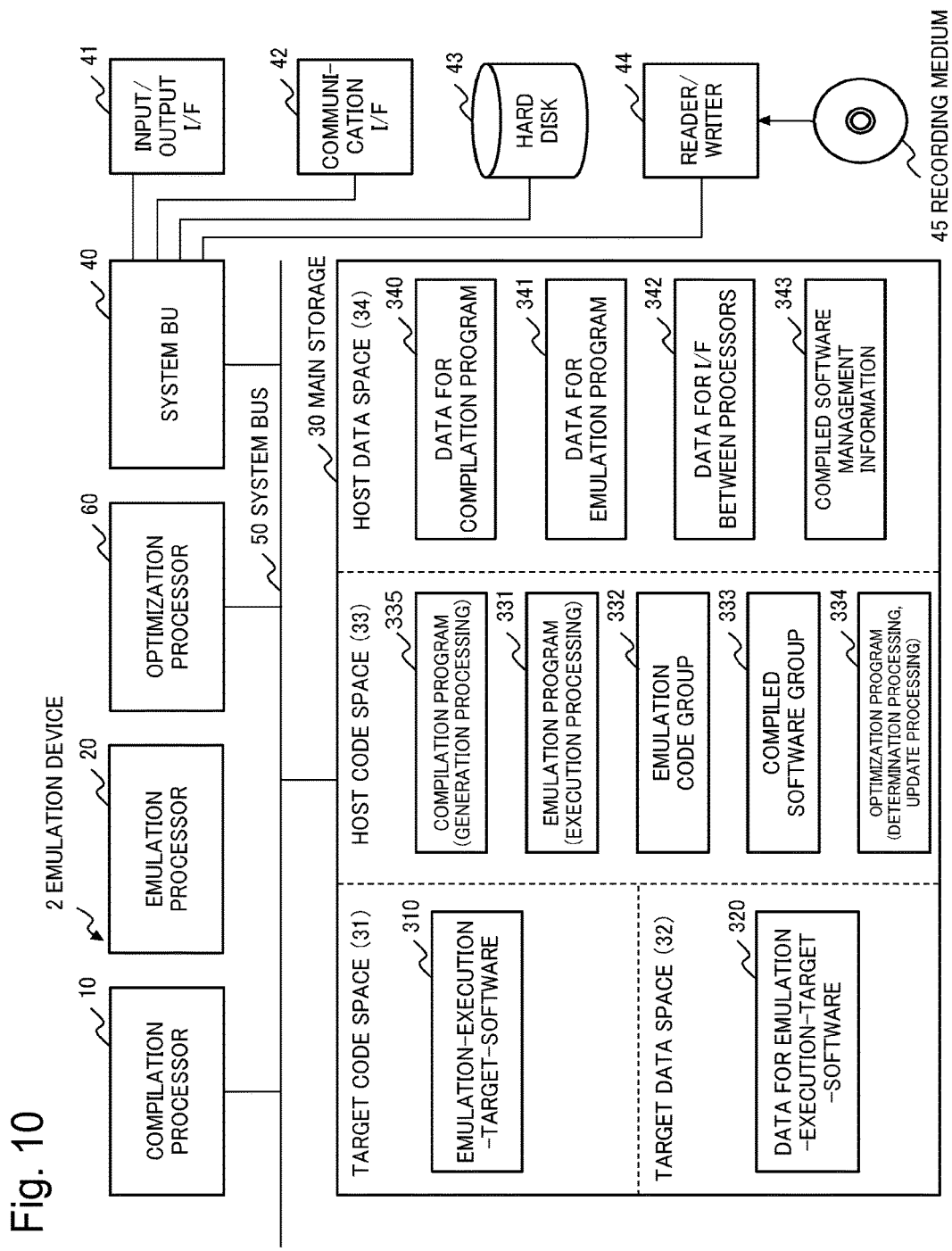
FIG. 10 is a block diagram showing a configuration of an emulation device 2 according to a second example embodiment of the present invention.

FIG. 10 is a block diagram conceptually showing a configuration of an emulation device 2 according to a second example embodiment of the present invention. In the explanation about this example embodiment, the same reference numbers are used for the elements having the same function as the first example embodiment and the description of the element will be omitted appropriately.

The emulation device 2 according to this example embodiment includes an optimization processor 60 in addition to the elements included in the emulation device 1 according to the first example embodiment. A compilation program 335 in which a function is added to the compilation program 330 stored in the main storage 30 according to the first example embodiment is stored in the host code space 33 in the main storage 30 according to this example embodiment. Further, an optimization program 334 is stored in the host code space 33 according to this example embodiment in addition to the information stored in the main storage 30 according to the first example embodiment. Further, compiled software management information 344 in which information indicating the number of execution times of each of the sets of compiled software 333-1 to 333-n is added to the compiled software management information 343 according to the first example embodiment is stored in the host data space 34 in the main storage 30 according to this example embodiment.

The compilation program 335 is a program for performing the processing (generation processing) for generating software that is a compilation result obtained by compiling the emulation-execution-target-software 310 and executed by the compilation processor 10.

The compilation processor 10 according to this example embodiment performs the following processing by executing the compilation program 335 in addition to the processing performed by the compilation processor 10 according to the first example embodiment. Namely, when the compilation processor 10 according to this example embodiment generates the sets of compiled software 333-1 to 333-n exemplarily shown in FIG. 2, the compilation processor 10 updates (counts) the number of execution times when the emulation is performed and includes instruction information (code) indicating the operation in which the updated number of execution times is stored as the compiled software management information 344 in the sets of compiled software 333-1 to 333-n. As a result, when the emulation processor 20 according to this example embodiment emulates the emulation-execution-target-software 310, the emulation processor 20 updates the number of execution times of each of the sets of compiled software 333-1 to 333-n and stores it in the main storage 30 as the compiled software management information 344.

The optimization program 334 is a program for performing a determination processing and the update processing that are processing for optimizing the environment in which the emulation-execution-target-software 310 is emulated by the emulation device 2 (processing for increasing the execution speed) and executed by the optimization processor 60.

Here, the determination processing is a processing for determining whether or not the number of execution times of emulating each of the compiled sets of software 333-1 to 333-n meets a criterion. As the criterion, for example, a criterion of "equal to or greater than a threshold value" or the like may be used.

The update processing mentioned above is a processing for updating the Call instruction (the subroutine read instruction) with the compilation emulation code called by the Call instruction in the compiled software 333-i (i is an integer from 1 to n) when it is determined in the determination processing that the number of execution times of the compiled software 333-i meets the criterion. For example, when the number of execution times of the compiled software 333-i shown in FIG. 2 exceeds the threshold value, in the update processing, the Call instruction for reading the compilation emulation code of the instruction X, the instruction Y, and the instruction Z to the compiled software 333-1 is replaced with the compilation emulation code itself of the instruction X, the instruction Y, and the instruction Z included in the emulation code group 332.

Figure 11A:
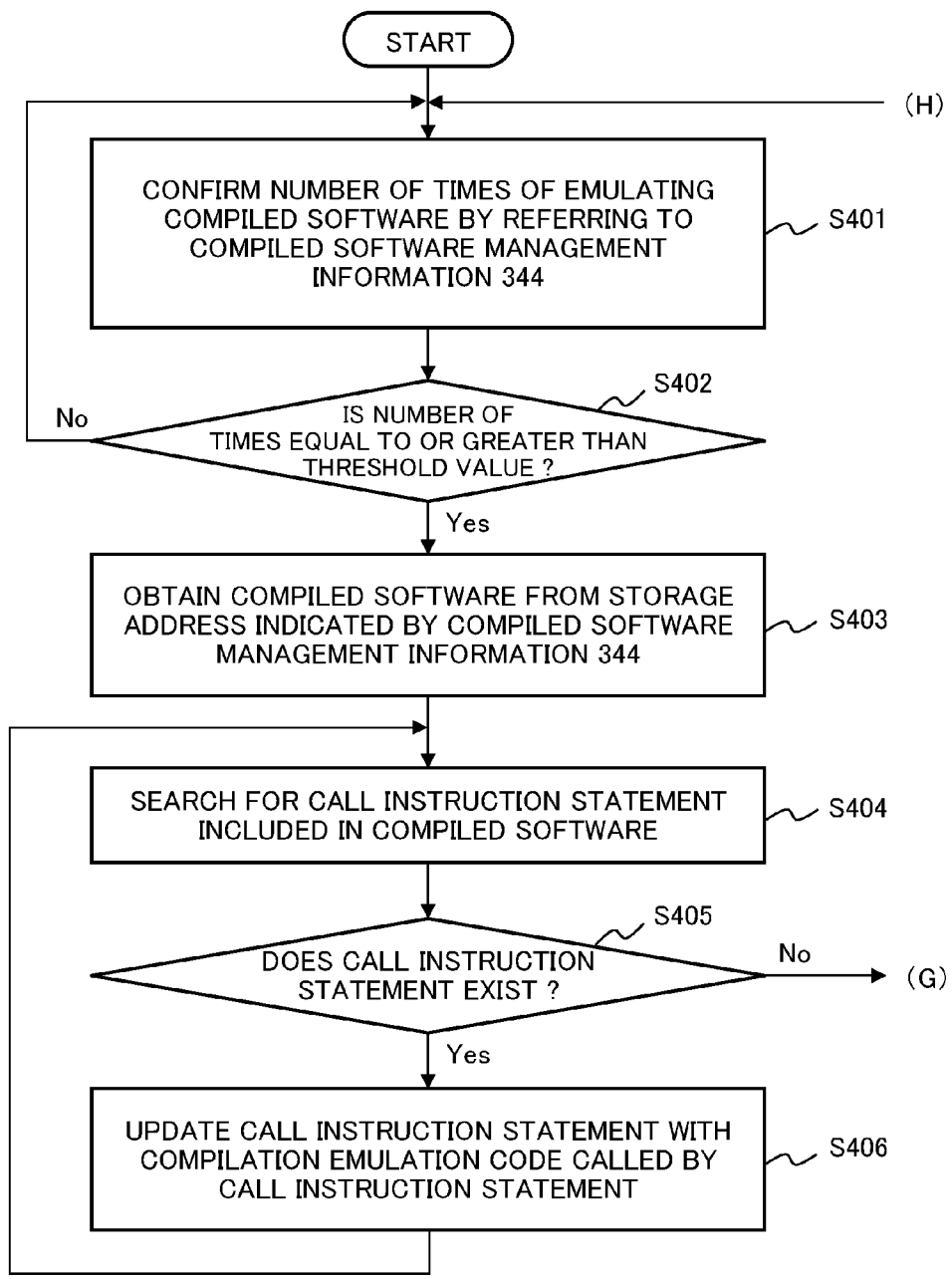
FIG. 11A is a flowchart (1/2) showing an operation of an optimization processor 60 in an emulation device 1 according to a second example embodiment of the present invention.
Figure 11B:
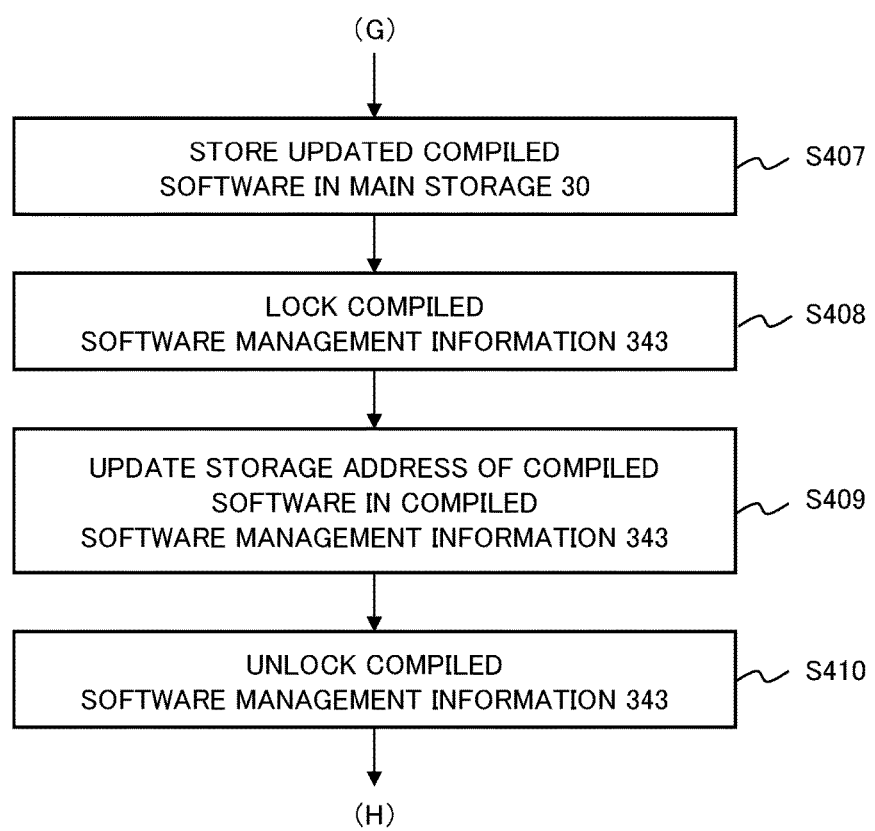
FIG. 11B is a flowchart (2/2) showing an operation of an optimization processor 60 in an emulation device 1 according to a second example embodiment of the present invention.

Next, the operation (processing) of the optimization processor 60 in the emulation device 2 according to the second example embodiment will be described in detail with reference to the flowcharts shown in FIGS. 11A and 11B.

The optimization processor 60 confirms the number of times of emulating the compiled software 333-*i* (i is an integer from 1 to n) by referring to the compiled software management information 344 (step S401). When the number of times is less than the threshold value (No in step S402), the processing goes back to step S401.

When the number of times is equal to or greater than the threshold value (Yes in step S402), the optimization processor 60 obtains the compiled software 333-*i* from a memory area corresponding to the storage address indicated by the compiled software management information 344 (step S403). The optimization processor 60 searches for a Call instruction statement included in the compiled software 333-*i* (step S404). When the Call instruction statement exists (Yes in step S405), the optimization processor 60 updates the Call instruction statement with the compilation emulation code called by the Call instruction statement (step S406) and the processing goes back to step S404.

When the Call instruction statement does not exist (No in step S405), the optimization processor 60 stores the updated compiled software 333-*i* in the main storage 30 (step S407). The optimization processor 60 locks the compiled software management information 343 (step S408). The optimization processor 60 updates the storage address of the compiled software 333-*i* in the compiled software management information 343 (step S409). The optimization processor 60 unlocks the compiled software management information 343 (step S410) and the processing goes back to step S401.

The emulation device 2 according to this example embodiment can increase the execution speed of the software that is executed by emulation. The reason is the same as that explained in the first example embodiment.

Further, as explained in the first example embodiment, when the compilation processing is performed by converting each instruction that is the compilation target into the subroutine read instruction for reading the emulation code, the time required for performing the compilation processing can be shortened. However, when the subroutine read instruction is executed, the processing for reading out the emulation code is performed and this takes an additional time. Accordingly, with respect to the instruction of which the number of execution times of the software that is executed by emulation is large, a problem in which the execution speed of the software that is executed by emulation decreases occurs due to the conversion into the subroutine read instruction by the compilation processing.

To solve such problem, in the emulation device 2 according to the second example embodiment, the compilation processor 10 generates the compiled software group 333 having a function to count the number of execution times of the software that is executed by emulation and store it in the main storage 30 by executing the compilation program 335. As a result, the number of execution times of each of the sets of compiled software 333-1 to 333-*n* is stored in the main storage 30 by the emulation processor 20. When the number of execution times of the compiled software 333-*i* is equal to or greater than the threshold value, the optimization processor 60 according to this example embodiment updates the Call instruction statement included in the compiled software 333-*i* with the compilation emulation code called by the Call instruction statement.

Namely, the emulation device 2 according to this example embodiment generates the compiled software group 333 in which the Call instruction statement is included in the instruction of which the number of execution times is less than the threshold value and the emulation code related to the instruction of which the number of execution times is equal to or greater than the threshold value is included in the instruction without changing it. Accordingly, the emulation device 2 according to this example embodiment can increase the execution speed of the software that is executed by emulation by shortening the time required to compile each instruction and the time required to execute the instruction in a balanced manner.

Further, the emulation device 2 according to this example embodiment includes the optimization processor 60 which performs the determination processing and the update processing by executing the optimization program 334. However, the configuration of the emulation device 2 is not limited to the configuration described above. For example, the emulation device 2 may include a determination unit (determination means) that is dedicated hardware for performing the determination processing and an update unit (update means) that is dedicated hardware for performing the update processing.

Third Example Embodiment

Figure 12:
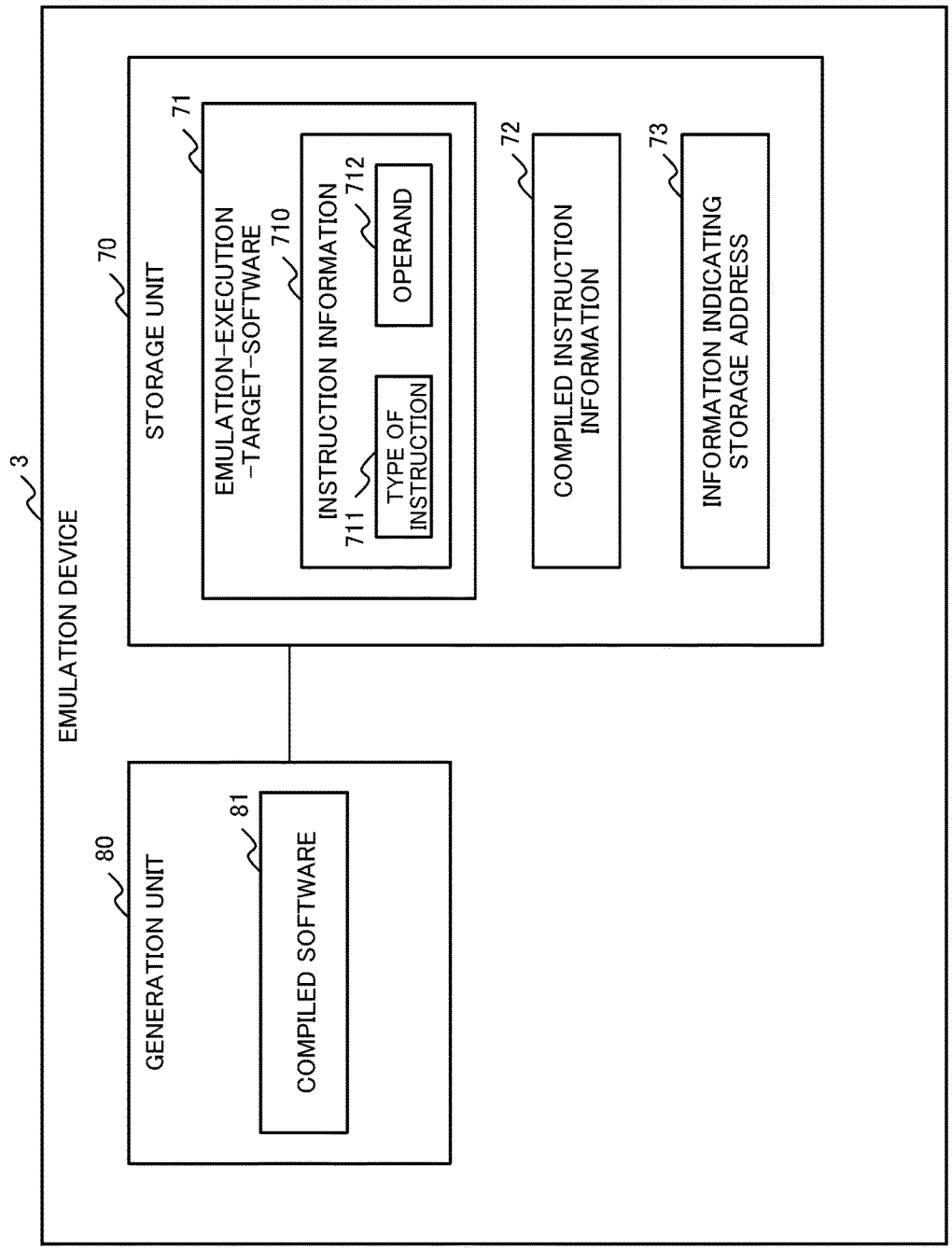
FIG. 12 is a block diagram showing a configuration of an emulation device 3 according to a third example embodiment of the present invention.

FIG. 12 is a block diagram conceptually showing a configuration of an emulation device 3 according to a third example embodiment of the present invention. The emulation device 3 includes a storage unit 70 and a generation unit 80.

Storage unit 70 stores information in which instruction information 710 including a type of an instruction 711 and an operand 712 included in emulation-execution-target-software 71, compiled instruction information 72 obtained by compiling the instruction information 710 capable of being emulated, and information 73 indicating the storage address of the compiled instruction information 72 are associated with.

The generation unit 80 converts the instruction information 710 into the subroutine-read-instruction-information which calls the compiled instruction information 72 associated with the instruction information 710 from the storage address indicated by the information 73 indicating the storage address. By this processing, the generation unit 80 generates compiled software 81 obtained by compiling the emulation-execution-target-software 71 capable of being emulated.

The emulation device 3 according to this example embodiment can increase the execution speed of the software that is executed by emulation. This is because the storage unit 70 and the generation unit 80 have the following function. Namely, the instruction information 710 that is the emulation execution target, the compiled instruction information 72, and the information 73 indicating the storage address of the compiled instruction information are associated with and stored in the storage unit 70. The generation unit 80 generates the compiled software 81 obtained by compiling the emulation execution target so that it can be emulated by converting the instruction information 710 into the subroutine-read-instruction-information which calls the compiled instruction information 72.

While the present invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

Further, it is noted that the inventor's intent is to retain all equivalents of the claimed invention even when the claims are amended during prosecution.

What is claimed is:

1. An emulation device for optimizing emulation of an emulation-execution-target-software written for a target environment for emulation in a host environment comprising:
   a compilation processor, an emulation processor and an optimization processor; and
   a memory storing instructions to be executed by the processors by causing the processors to execute:
   storing, in a target code space, instruction information for each instruction of the emulation-execution-target-software including a type of the instruction and an operand included in the instruction;
   storing, in a host code space, a subroutine program group, wherein each subroutine in the subroutine program group is a complied emulation code written in a host code for the each instruction of the emulation-execution-target-software using the stored instruction information;
   storing, in the host code space, a compiled software group comprising of sets of one or more compiled software, wherein the sets of one or more compiled software is a result obtained by compiling at least a part of the emulation-execution-target-software, wherein each instruction of the emulation-execution-target-software in the compiled software is replaced by a call to a corresponding subroutine from the subroutine program group written in the host code;
   storing, in the host code space, storage address of each of the one or more sets of the compiled software so that the emulation-execution-target-software can be emulated using the compiled software and the corresponding storage address;
   emulating the emulation-execution-target-software on the host by executing the one or more sets of compiled software, which in turn calls the corresponding subroutines of the compiled emulation code written in the host code;
   determining whether a number of times of execution of a compiled software of the one or more sets of compiled software exceeds a threshold value; and
   in response to the determination, obtaining the compiled software and updating call instructions to the subroutines in the compiled software with compiled emulation code of the subroutine, thereby causing improved speed of execution by the emulation processor executing the emulation-execution-target software that has been compiled and in which the compiled software has been updated with compiled emulation code of subroutines.

2. The emulation device according to claim 1, wherein the processors store a compiled instruction information generated on the basis of a value indicated by the type of the instruction and a value indicated by the operand.

3. The emulation device according to claim 1, wherein with respect to two sets of the instruction information sequentially executed in the emulation-execution-target-software, when the preceding instruction information indicates an instruction other than a branch instruction, the processors generate the compiled software in which the preceding instruction information is converted into a subroutine-read-instruction-information and then the subsequent instruction information is converted into a subroutine-read-instruction-information, and when the preceding instruction information indicates a branch instruction, the processors generate the compiled software in which a return instruction that is an instruction to end the execution of the compiled software is inserted after the preceding instruction information.

4. The emulation device according to claim 1, wherein the processors execute:
   executing the emulation of the emulation-execution-target-software by using the compiled software; wherein
   generating one or more sets of the compiled software, associates the generated compiled software with a value that indicates an instruction pointer showing an execution address in the emulation-execution-target-software which is associated with the compiled software, and stores the generated compiled software; and
   reading out the compiled software as has been stored and execute the compiled software when the compiled software associated with the value indicated by the instruction pointer.

5. The emulation device according to claim 4, wherein the processors generate the compiled software obtained by compiling the instruction information indicated by the instruction pointer and executes the emulation of the instruction information indicated by the instruction pointer by an interpreter method when the compiled software associated with the value indicated by the instruction pointer is not stored; and
   the processors generate the compiled software by compiling the instruction information indicated by the instruction pointer according to the instruction.

6. The emulation device according to claim 5, wherein the processors register the value indicated by the instruction pointer showing the instruction information, that is a target of an instruction for generating the compiled software, in any of one or more entries that have been stored; and
   the processors generate the compiled software by compiling the instruction information specified by the value indicated by the instruction pointer registered in the entry.

7. The emulation device according to claim 1, wherein the processors update the number of times of execution when the compiled software is emulated, and add information indicating the operation to store the updated number of times of execution to the compiled software; and
   the processors refer to the number of times of execution as has been stored.

8. An emulation method for optimizing emulation of an emulation-execution-target-software written for a target environment for emulation in a host environment comprising:
   storing, in a target code space, instruction information for each instruction of the emulation-execution-target-software including a type of the instruction and an operand included in the instruction;
   storing, in a host code space, a subroutine program group, wherein each subroutine in the subroutine program group is a complied emulation code written in a host code for the each instruction of the emulation-execution-target-software using the stored instruction information;
   storing, in the host code space, a compiled software group comprising of sets of one or more compiled software, wherein the sets of one or more compiled software is a result obtained by compiling at least a part of the emulation-execution-target-software, wherein each instruction of the emulation-execution-target-software in the compiled software is replaced by a call to a corresponding subroutine from the subroutine program group written in the host code;

storing, in the host code space, storage address of each of the one or more sets of the compiled software so that the emulation-execution-target-software can be emulated using the compiled software and the corresponding storage address;

emulating the emulation-execution-target-software on the host by executing the one or more sets of compiled software, which in turn calls the corresponding subroutines of the compiled emulation code written in the host code;

determining whether a number of times of execution of a compiled software of the one or more sets of compiled software exceeds a threshold value; and in response to the determination, obtaining the compiled software and updating call instructions to the subroutines in the compiled software with compiled emulation code of the subroutine, thereby causing improved speed of execution by an emulation processor executing the emulation-execution-target software that has been compiled and in which the compiled software has been updated with compiled emulation code of subroutines.

9. A non-transitory computer readable recording medium storing an emulation program for optimizing emulation of an emulation-execution-target-software written for a target environment for emulation in a host environment, the program when executed by a computer causes the computer to perform a method, the method comprising:

storing, in a target code space, instruction information for each instruction of the emulation-execution-target-software including a type of the instruction and an operand included in the instruction;

storing, in a host code space, a subroutine program group, wherein each subroutine in the subroutine program group is a complied emulation code written in a host code for the each instruction of the emulation-execution-target-software using the stored instruction information;

storing, in the host code space, a compiled software group comprising of sets of one or more compiled software, wherein the sets of one or more compiled software is a result obtained by compiling at least a part of the emulation-execution-target-software, wherein each instruction of the emulation-execution-target-software in the compiled software is replaced by a call to a corresponding subroutine from the subroutine program group written in the host code;

storing, in the host code space, storage address of each of the one or more sets of the compiled software so that the emulation-execution-target-software can be emulated using the compiled software and the corresponding storage address;

emulating the emulation-execution-target-software on the host by executing the one or more sets of compiled software, which in turn calls the corresponding subroutines of the compiled emulation code written in the host code;

determining whether a number of times of execution of a compiled software of the one or more sets of compiled software exceeds a threshold value; and in response to the determination, obtaining the compiled software and updating call instructions to the subroutines in the compiled software with compiled emulation code of the subroutine, thereby causing improved speed of execution by an emulation processor executing the emulation-execution-target software that has been compiled and in which the compiled software has been updated with compiled emulation code of subroutines.

\* \* \* \* \*